United States Patent
Seto et al.

(10) Patent No.: US 7,607,741 B2
(45) Date of Patent: *Oct. 27, 2009

(54) AUTOMATIC BRAKE SYSTEM OF MOTOR VEHICLE

(75) Inventors: Yoji Seto, Kanagawa (JP); Yoshinori Yamamura, Yokohama (JP); Yosuke Kobayashi, Yokohama (JP); Minoru Tamura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 717 days.

This patent is subject to a terminal disclaimer.

(21) Appl. No.: 10/237,613

(22) Filed: Sep. 10, 2002

(65) Prior Publication Data

US 2003/0067219 A1 Apr. 10, 2003

(30) Foreign Application Priority Data

Oct. 4, 2001 (JP) ............................. 2001-309247

(51) Int. Cl.
*B60T 8/32* (2006.01)
(52) U.S. Cl. ....................................... 303/193; 701/96
(58) Field of Classification Search ................. 303/193; 701/96 X, 93, 96
See application file for complete search history.

(56) References Cited

U.S. PATENT DOCUMENTS

| 6,017,102 A | 1/2000 | Aga |
| 6,021,375 A | 2/2000 | Urai et al. |
| 6,084,508 A | 7/2000 | Mai et al. |
| 6,294,987 B1 | 9/2001 | Matsuda et al. |
| 6,889,786 B2 * | 5/2005 | Watanabe et al. ........... 180/167 |

FOREIGN PATENT DOCUMENTS

| DE | 198 06 687 A1 | 8/1999 |
| EP | 1 223 093 A2 | 7/2002 |
| JP | 6-298022 | 10/1994 |
| WO | WO 02/058955 A1 | 8/2002 |

* cited by examiner

*Primary Examiner*—Xuan Lan Nguyen
(74) *Attorney, Agent, or Firm*—Foley & Lardner LLP

(57) ABSTRACT

When it is judged that a possible collision of the own vehicle with a preceding vehicle is avoidable by operation of either one of the brake pedal and steering wheel, a first grade braking force is automatically produced. While, when it is judged that the possible collision is unavoidable by operation of either of the brake pedal and steering wheel, a second grade braking force is automatically produced, which is greater than the first grade braking force.

12 Claims, 5 Drawing Sheets

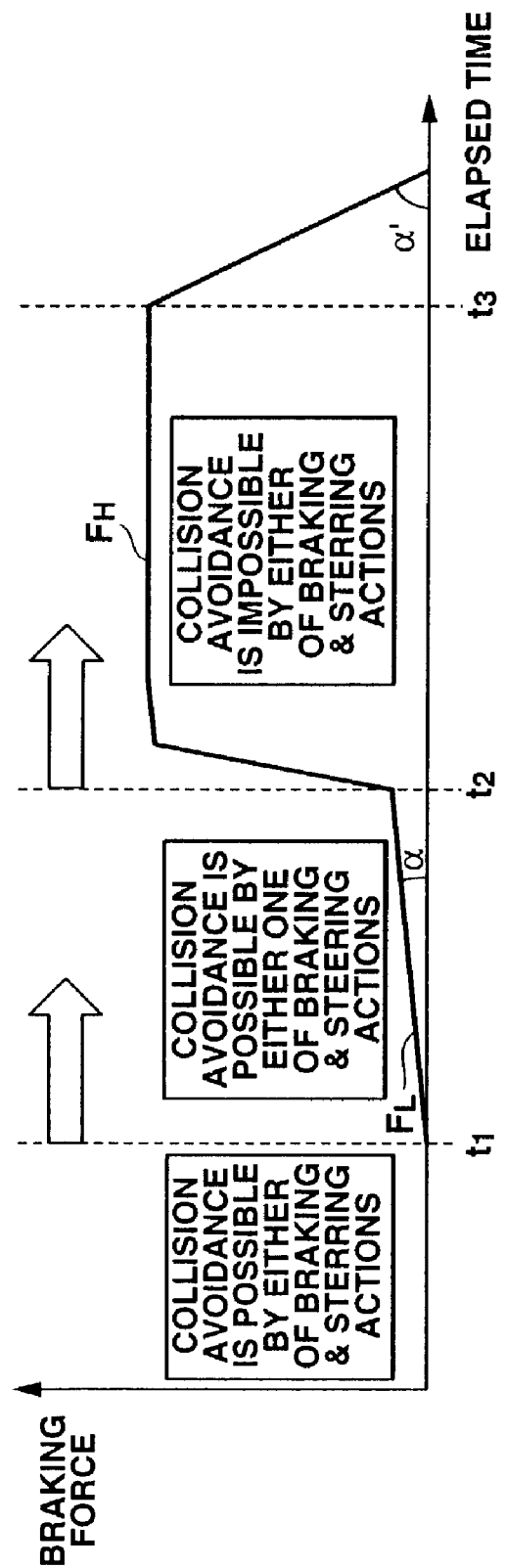

AUTOMATIC BRAKE SYSTEM OF MOTOR VEHICLE

BACKGROUND OF INVENTION

1. Field of Invention

The present invention relates in general to brake systems of wheeled motor vehicles, and more particularly the brake systems of an automatic type that automatically brakes the own vehicle when a collision against the preceding vehicle is highly estimated.

2. Description of Related Art

Hitherto, for the purpose of safety driving, various automatic brake systems of the above-mentioned type have been proposed and put into practical use in the field of wheeled motor vehicles.

Some of the automatic brake systems are of a type that includes a radar device mounted on the own vehicle for detecting a vehicle interval distance between the own vehicle and the preceding vehicle and automatically brakes the own vehicle when a collision against the preceding vehicle is highly estimated with respect to the detected vehicle interval distance and speeds of the two vehicles.

Laid-open Japanese Patent Applications (Tokkaihei) 6-298022 shows an automatic brake system of the above-mentioned type. In the system of this publication, a first safety distance capable of avoiding a collision by a brake pedal operation and a second safety distance capable of avoiding the collision by a steering wheel operation are both calculated. When a detected vehicle interval distance is smaller than either one of the first and second safety distances, automatic braking takes place. However, due to an inherent construction, the automatic brake system of the publication has failed to exhibit a satisfied operation.

SUMMARY OF INVENTION

It is therefore an object of the present invention to provide an automatic brake system of a motor vehicle, which is superior to the above-mentioned brake system.

More specifically, the present invention aims to provide an automatic brake system of a motor vehicle, which can brake the vehicle at an assured timing without providing a driver with an uncomfortable braking shock.

In accordance with the present invention, there is provided an automatic brake system of a motor vehicle which has a brake pedal and a steering wheel installed therein, the system comprising a first section that detects a relative connection between the vehicle and a preceding object ahead of the vehicle; a second section that, when actuated, produces a braking force applied to the vehicle, the braking force produced by the second section being isolated from a braking force produced by the brake pedal; a third section that, based on the relative connection detected by the first section, carries out a judgment as to whether or not a possible collision of the vehicle with the preceding object is avoidable by operation of at least one of the brake pedal and the steering wheel; and a fourth section that actuates and controls the second section in accordance with the judgment made by the third section, thereby to control the braking force applied to the vehicle, wherein the fourth section is configured to carry out causing the second section to produce a first grade braking force when the third section judges that the possible collision would be avoidable by operation of either one of the brake pedal and the steering wheel; and causing the second section to produce a second grade braking force when the third section judges that the possible collision would be unavoidable by operation of either of the brake pedal and the steering wheel, the second grade braking force being greater than the first grade braking force.

BRIEF DESCRIPTION OF DRAWINGS

FIG. 9 is an illustration depicting the operation carried out by the invention.

DETAILED DESCRIPTION OF EMBODIMENT

Figure 1:
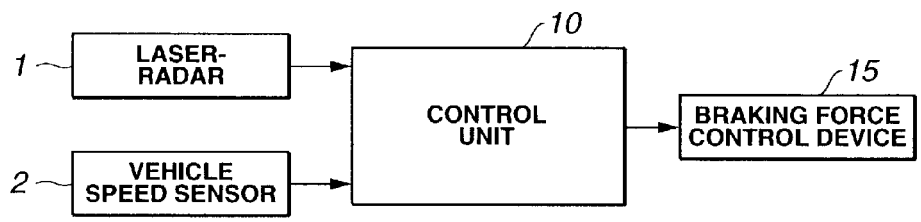
FIG. 1 is a block diagram of an automatic brake system of the present invention.

In FIG. 1, there is shown a block diagram of an automatic brake system of the present invention.

In the drawing, denoted by numeral 1 is a scanning type laser-radar that detects a vehicle interval distance, that is, the distance between an own vehicle and a preceding vehicle. It is to be noted that the own vehicle is the vehicle that has the automatic brake system of the invention mounted thereon, and the preceding vehicle is the vehicle that is running ahead of the own vehicle.

Laser-radar 1 is mounted on a laterally middle front position of the own vehicle. Laser-radar 1 emits periodically a laser ray forward scanning over a predetermined angle range and receives a laser ray that has been reflected from the preceding vehicle. Based on a time difference between the laser ray emitting timing and laser ray receiving timing, a vehicle interval distance between the preceding vehicle and the own vehicle is actually measured in each scanning angle. Denoted by numeral 2 is a vehicle speed sensor that detects a vehicle speed of the own vehicle. Information signals from laser-radar 1 and vehicle speed sensor 2 are led into a control unit 10. Control unit 10 has a micro-processor that comprises generally a central processing unit (CPU), a random access memory (RAM), a read only memory (ROM) and input and output interfaces.

In control unit 10, a automatic brake control process is carried out in a predetermined period. That is, based on the information signals from laser-radar 1 and vehicle speed sensor 2, judgment is carried out as to whether an automatic braking is needed or not. If need is judged, control unit 10 controls a braking force control device 15 to produce a controlled braking force applied to road wheels of the own vehicle. It is to be noted that braking force control device 15 is of a brake-by-wire type which has no direct connection with a brake pedal mounted in the own vehicle.

Figure 2:
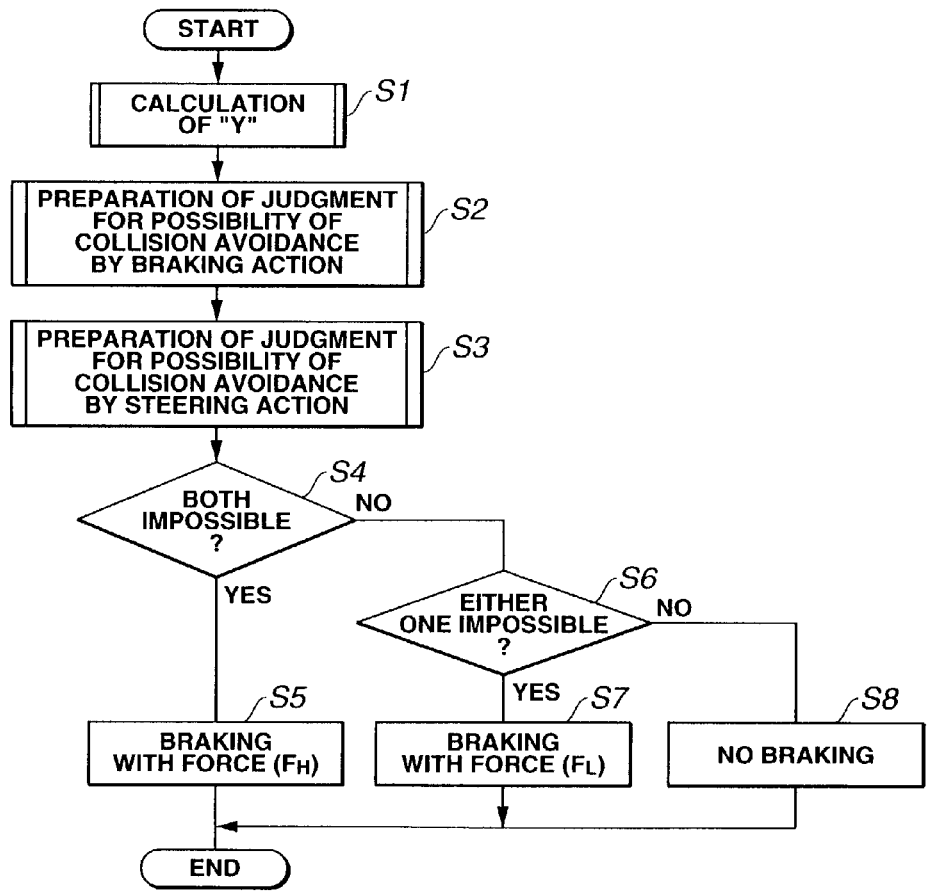
FIG. 2 is a flowchart showing programmed operation steps executed by a control unit employed in the present invention.

Referring to FIG. 2, there is shown a flowchart that depicts programmed operation steps executed by control unit 10.

That is, at step St, a needed lateral moved distance "Y" is calculated. For this calculation, information signals from laser-radar 1 are read and based on these signals, a relative vehicle interval distance "d" and a relative vehicle speed "Vr" in the traveling direction of the own vehicle are detected. Furthermore, based on the information signals from laser-radar 1, distances between each of right and left rear edges of the preceding vehicle and a laser-emitter of laser-radar 1 and angles of the right and left rear edges of the preceding vehicle relative to the laser-emitter of laser-radar 1 are detected. Based on these detected data, the lateral moved distance "Y" needed for avoiding a possible collision of the own vehicle with the preceding vehicle is calculated.

The relative vehicle speed "Vr" is provided by differentiating the relative vehicle interval distance "d" with time, that is, by treating the signal of the distance "d" by a band-pass filter.

The right and left rear edges of the preceding vehicle are detected based on the detected information signals provided by laser-radar 1, and based on the angles of the right and left rear edges, the needed lateral moved distance "Y" is calculated. That is, as is seen from FIG. 3, with respect to traveling direction of own vehicle, the angles "θ1" and "θ2" of the right and left rear edges of the preceding vehicle are derived based on detected information signals from laser-radar 1 and a scanning angle of the emitted laser beam. Then, the smaller angle, that is, the angle "θ1" in the two angles, is selected for calculating the needed lateral moved distance "Y" by using the following equation (1):

$$Y = d \times \sin(\theta) + Lw/2 \qquad (1)$$

wherein:
   Lw: width of own vehicle

It is to be noted that equation (1) is based on a case wherein laser-radar 1 is located at the laterally middle portion of the own vehicle. Thus, when laser-radar 1 is located at a position offset from the laterally middle portion, it is necessary to modify the equation (1) by taking the offset degree into consideration.

When the own vehicle is considerably offset to the preceding vehicle with respect to a traveling path, it sometimes occurs that one of the angles "θ1" and "θ2" of the right and left rear edges of the preceding vehicle fails to be detected. However, in such case, the detected one is used in the equation (1) for deriving the needed lateral moved distance "Y".

In the above mentioned case, as laser-radar 1, a scanning type is used. However, in place of such type, a multi-beam type may be also used in the present invention.

Figure 4:
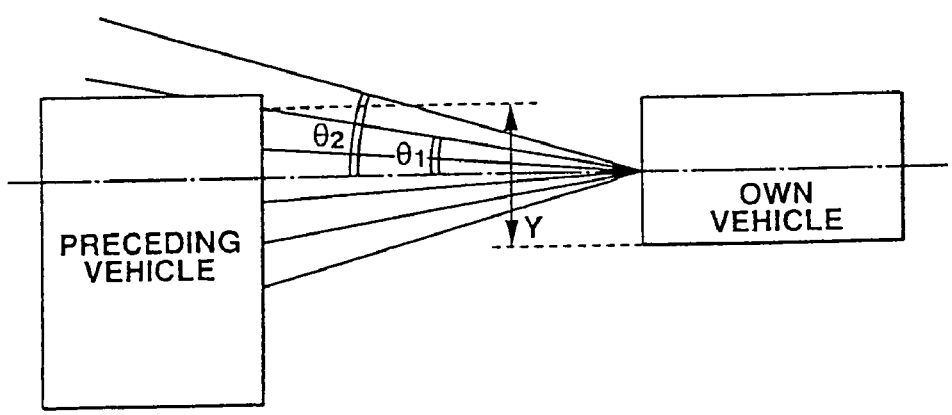
FIG. 4 is an illustration showing the concept of measuring the vehicle interval distance by using a multi-beam type laser-radar.

That is, in case of the multi-beam type laser-radar, as is shown in FIG. 4, based on detected information signals from laser-radar 1, the preceding vehicle is detected as an object placed in a zone having a certain width. In case of FIG. 4, judgment is so made that, with respect to the traveling direction of own vehicle, the preceding vehicle is placed within a zone more left than a right position that is displaced from a position of angle "θ1" by an angle of "θ2". In the illustrated case, the right rear edge of the preceding vehicle is detected as a position of the smallest angle "θ1", and the above equation (1) is used for deriving a needed lateral moved distance "Y" using the angle "θ1" as "θ".

If, like in the above-mentioned scanning type laser-radar 1, only one of right and left rear edges of the preceding vehicle is detected, the angle of the detected right or left rear edge is used in the equation (1) for obtaining the needed lateral moved distance "Y".

Furthermore, when laser-radar 1 is located at a position offset from the laterally middle portion of the own vehicle, there is a need of modifying the equation (1) by taking the offset degree into consideration.

As has been described hereinabove, even when the offset degree of the preceding vehicle relative to the own vehicle varies, the lateral moved distance needed for avoiding a possible collision against the preceding vehicle by handling a steering wheel is calculated in accordance with the various situations. Thus, calculation for judging whether the collision would be avoided by handing the steering wheel is precisely carried out.

Referring back to the flowchart of FIG. 2, at step S2, preparation of judgment for possibility of collision avoidance by braking action is made. That is, the judgment is carried out as to whether or not the vehicle collision would be avoided by depressing a brake pedal of the own vehicle.

Figure 3:
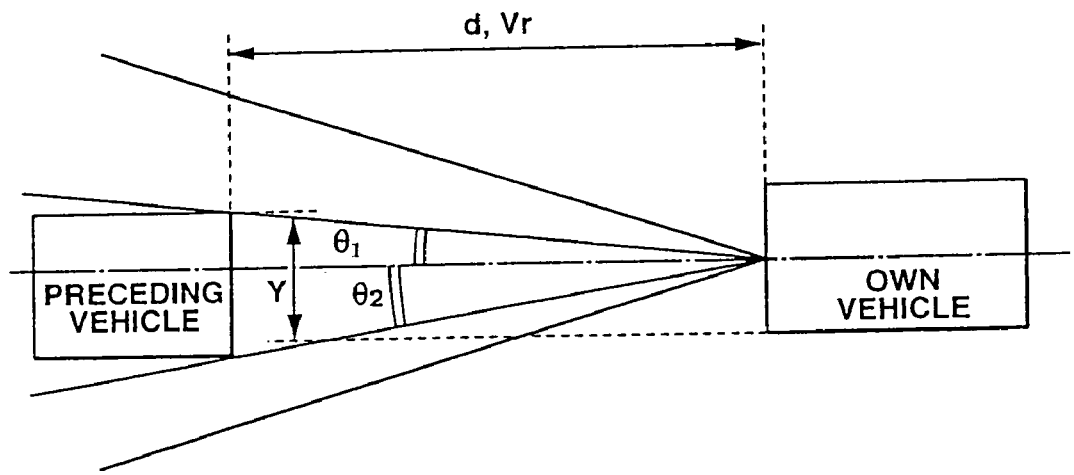
FIG. 3 is an illustration showing the concept of measuring the vehicle interval distance by using a scanning type laser-radar.

That is, as is shown in FIG. 3, when it is assumed that the vehicle interval distance and the relative vehicle speed are "d" and "Vr" respectively, a deceleration obtained when braking the own vehicle for avoiding the collision is "a" (for example, 8.0 m/s$^2$) and a dead time elapsed from a time when a brake pedal is depressed by a driver to a time when due to the brake pedal depression a certain deceleration is actually produced is "Td" (for example, 0.2 sec), avoidance of the vehicle collision is possible only when satisfying the following inequality (2), $$d < -Vr \times Td + (Vr)^2/(2 \times a) \qquad (2)$$

Thus, by applying the relative vehicle interval distance "d" and relative vehicle speed "Vr", which are derived at step S1, to the above inequality (2), judgment is carried out.

Then, at step S3, preparation of judgment for possibility of collision avoidance by steering action is made. That is, judgment is carried out as to whether or not the vehicle collision would be avoided by turning the steering wheel of own vehicle.

First, a time "Ty" needed by the own vehicle for carrying out a lateral movement by the lateral moved distance "Y" is calculated. Now, a steering characteristic of the own vehicle is represented by the following equations (3) and (4):

$$m \times v \times (r + dB/dt) = 2 \times Y_F + 2 \times Y_R \qquad (3)$$

$$Iz \times dr/dt = 2 \times 1_F \times Y_F - 2 \times 1_R \times Y_R \qquad (4)$$

$$Y_F = f_F \times [\beta + (1_F/V) \times r - \theta_F]$$

$$Y_R = f_R \times [\beta - (1_R/V) \times r]$$

wherein:
   m: weight of vehicle;
   Iz: inertia moment of vehicle in yaw direction;
   v: speed of vehicle;
   r: yaw rate
   β: slip angle of vehicle body;
   1$_F$: distance between center of gravity of vehicle body and an axis passing through centers of front wheels;
   1$_R$: distance between center of gravity of vehicle body and axis passing through centers of rear wheels;
   Y$_F$: lateral force generated in front wheels;
   Y$_R$: lateral force generated in rear wheels; and
   θ$_F$: steered angle of front wheels.

Figure 5:
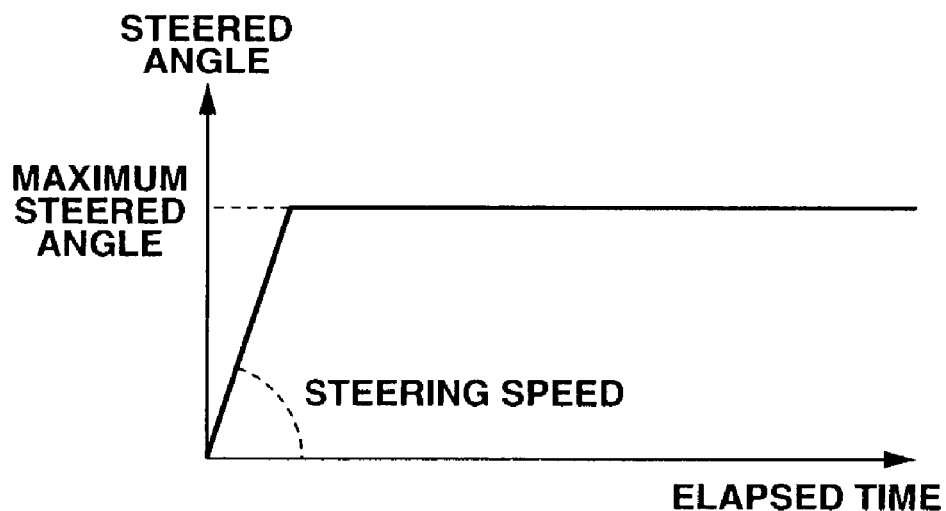
FIG. 5 is a characteristic graph depicting a steering action made by a driver in an emergency.

For providing the equations (3) and (4), an assumption is so made that, as is seen from the graph of FIG. 5, in an emergency, a driver turns a steering wheel to a maximum steered position (viz., by a maximum steered angle) at a certain steering speed. In FIG. 5, the x-axis indicates an elapsed time and y-axis indicates a steered angle. That is, as shown in the graph, in an emergency, the steered angle is instantly increased to the maximum value at a certain speed (viz., gradient).

Figure 6:
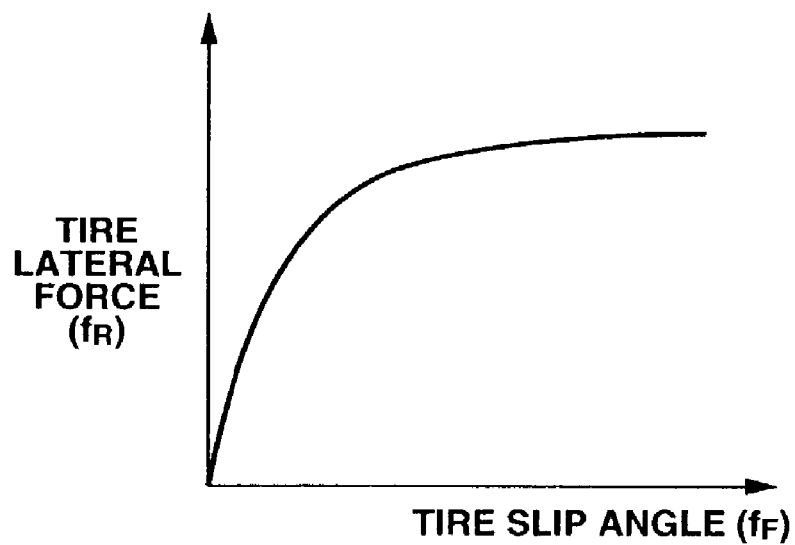
FIG. 6 is a characteristic graph showing a relation between a tire slip angle and a tire lateral force.

It is to be noted that "$f_F$" and "$f_R$" are functions that represent correspondence to a tire slip angle and a tire lateral force respectively. FIG. 6 is a graph showing the relationship between tire slip angle "$f_F$" and tire lateral force "$f_R$". As shown, with increase of tire slip angle "$f_F$", tire lateral force "$f_R$" increases, and at a smaller zone of tire slip angle "$f_F$", variation of tire lateral force "$f_R$" relative to tire slip angle "$f_F$" is high.

Now, the lateral moved distance "Y" is represented by the following equation (5), that is, by vehicle speed "v", yaw rate "r" and vehicle body slip angle "β":

$$Y=\int[v\times\sin(\int r\,dt+\beta)]dt \tag{5}$$

Accordingly, by practically using the equations (3), (4) and (5), the time needed for carrying out the lateral movement by the lateral moved distance "Y" can be calculated.

If the equations (3), (4) and (5) are executed on an on-line system, remarkable time is needed. Thus, if necessary, such execution may be carried out on an off-line. In this case, the results are depicted by a map as shown in FIG. 7.

Figure 7:
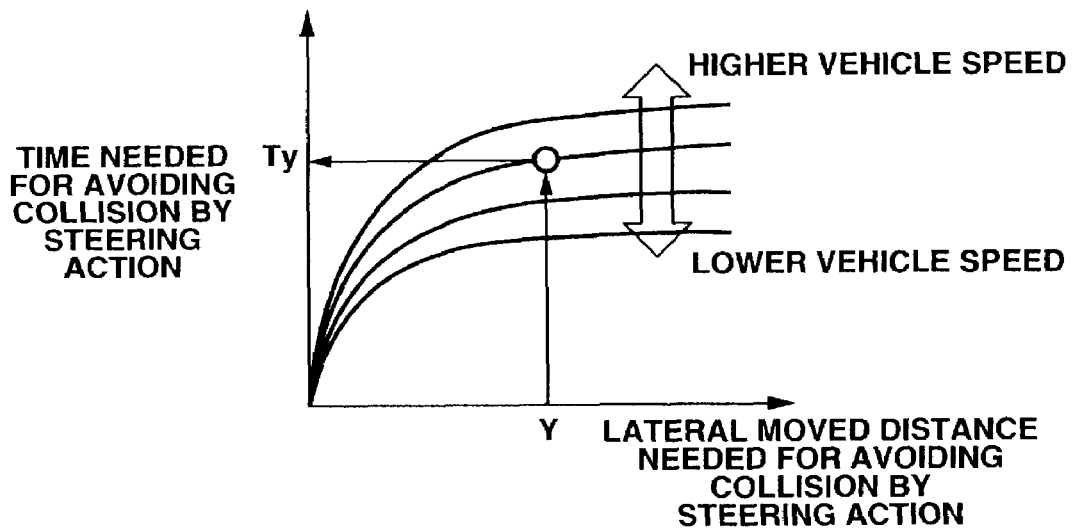
FIG. 7 is a characteristic graph depicting a relation between a lateral moved distance needed for avoiding a collision by operating a steering wheel, a time needed for avoiding the collision by operating the steering wheel and a vehicle speed.

In the map of FIG. 7, the x-axis indicates the lateral moved distance "Y" needed for avoiding a collision by handling a steering wheel and the y-axis indicates the time "Ty" needed for avoiding a collision by handling the steering wheel. As shown, with increase of the needed lateral moved distance "Y", the needed time "Ty" increases, and with decrease of vehicle speed, the needed time "Ty" decreases. Accordingly, in order to find out the time "Ty" needed for avoiding a collision against the preceding vehicle by handling a steering wheel, the map of FIG. 7 can be used.

If an estimated time "d/Vr" until a collision and the needed time "Ty" for avoiding the collision by handling the steering wheel satisfy the following inequality (6), judgment is so made that it is impossible to avoid the collision by handling the steering wheel.

$$d/Vr<Ty \tag{6}$$

Based on the results of execution of the equations (3), (4), (5) and (6), judgment is carried out as to whether avoidance of collision of own vehicle against the preceding vehicle is possible or not by handling a steering wheel. That is, the needed time for avoiding a collision by handling the steering wheel is calculated in accordance with the steering characteristic of the own vehicle, and thus, judgment for possibility of the collision is precisely carried out. Furthermore, in the present invention, the steering behavior characteristic of a driver in an emergency is practically used for calculating the time needed for avoiding the collision by handling steering wheel. Thus, much precise calculation of the needed time is obtained.

Referring back to the flowchart of FIG. 2, at step S4, judgment is carried out as to whether or not avoidance of the collision is impossible by either of depressing the brake pedal (S2) and turning the steering wheel (S3). If YES, that is, when it is judged that the collision would not be avoided even when the brake pedal is depressed and the steering wheel is turned, the operation flow goes to step S5. At this step S5, an instruction signal is applied to braking force control device 15 (see FIG. 1) to produce a predetermined higher degree of braking force "$F_H$".

If NO at step S4, that is, when it is judged that avoiding of collision by depressing the brake pedal and turning the steering wheel is possible, the operation step goes to step S6. At this step S6, judgment is carried out as to whether avoidance of collision is impossible or not by one of the braking and steering actions.

If YES at step S6, that is, if avoiding of collision by one of the braking and steering actions is judged impossible (in other words, avoiding of collision by one of the braking and steering actions is judged possible), the operation flow goes to step S7. At this step S7, an instruction signal is applied to braking force control device 15 to produce a lower degree of braking force "$F_L$".

While, if NO at step S6, that is, if avoiding of collision by either of the braking and steering actions is judged possible, the operation flow goes to step S8. At this step S8, an instruction signal is applied to braking force control device 15 to stop generation of the braking force.

Figure 8:
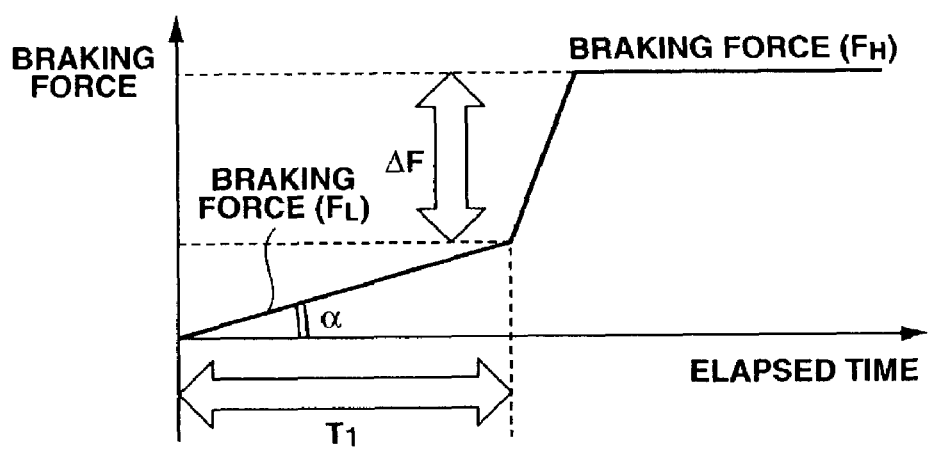
FIG. 8 is an illustration depicting a relation between braking forces $F_L$ and $F_H$.

As is seen from the graph of FIG. 8, the above-mentioned braking force "$F_L$" is a force that gradually increases with a certain gradient "α", and the above-mentioned braking force "$F_H$" is set at a predetermined value that is greater than the braking force "$F_L$". As is seen from the graph, upon need of the higher braking force "$F_H$", the braking force "$F_L$" has already shown an increased value. Thus, when it is judged that avoidance of collision by either of the braking and steering actions is impossible, the higher braking force "$F_H$" is instantly obtained.

The gradient "α" of the braking force "$F_L$" is so determined that upon shifting of the braking force from value "$F_L$" to value "$F_H$", the difference "ΔF" appearing therebetween is smaller than a predetermined value. The difference "ΔF" is so determined as not to give a driver an uncomfortable braking shock. Concretely, the difference "ΔF" is determined by the following manner.

First, a time "T1" that would pass from a time when the lower braking force "$F_L$" is actually applied to the road wheels and a time when the higher braking force "$F_H$" is actually applied to the road wheels is estimated. That is, in case wherein after judgment of impossibility of collision avoidance by the braking action, judgment is so made that the collision avoidance is also impossible even by the steering action, the estimated time "T1" is derived from the following equation (7):

$$T1=d/Vr-Ty \tag{7}$$

wherein:
Ty: time needed for avoiding collision by handling steering wheel (see step S3).

While, in case wherein after judgment of impossibility of collision avoidance by the steering action, judgment is so made that the collision avoidance is also impossible even by the braking action, the estimated time "T1" is derived from the following equation (8):

$$T1=-(d-Vr^2/2\times a+Vr\times Td)/Vr \tag{8}$$

Based on the estimated time "T1" thus obtained from equation (7) or (8), the gradient "α" of braking force is derived from the following equation (9):

$$\alpha=(F_H-\Delta F)/T1 \tag{9}$$

The braking force "$F_L$" is controlled to gradually increase with the gradient "α" thus obtained.

In the following, operation of the automatic brake system of the present invention will be described.

When a preceding vehicle is running ahead of the own vehicle, information signals issued by laser-radar 1 are led into control unit 10, and based on the signals, control unit 10 derives the vehicle interval distance "d" and the relative vehicle speed "Vr", and derives the respective angles defined by the right and left rear edges of the preceding vehicle relative to the laser-emitter of the own vehicle in the above-mentioned manner.

When now, as is seen from FIG. 2, the preceding vehicle is running on a traveling line that is more left than that of the own vehicle, both the angles "θ1" and "θ2" of the right and left rear edges of the preceding vehicle relative to the laser-emitter of the own vehicle are detected. The smaller angle "θ1" is selected, and based on the selected smaller angle "θ1", the needed lateral moved distance "Y" is calculated (step S1 of FIG. 2).

When, due to a greater value of the vehicle interval distance "d", the inequality (2) is satisfied, judgment is so made that a collision against the preceding vehicle can be avoided by depressing the brake pedal (step S2). Then, the time "Ty" needed for moving the own vehicle by the lateral moved distance "Y" is calculated. And, if the needed time "Ty" fails to satisfy the inequality (6), judgment is so made that the collision can be avoided by turning the steering wheel. Thus, the operation flow goes through steps S4 and S6 to step S8. In this case, generation of braking force by braking force control device 15 is not carried out.

That is, when the vehicle interval distance "d" between the own vehicle and the preceding vehicle is great, braking force control device 15 does not produce a braking force while judging that a possible collision against the preceding vehicle can be avoided by normal control effected by the driver, that is, by depressing the brake pedal and/or turning the steering wheel.

When thereafter the relative vehicle interval distance "d" becomes shorter to such a value that the inequality (2) is satisfied but the time "Ty" needed for avoiding the collision by the steering action fails to satisfy the equation (7), judgment is so made that the collision avoidance is possible by the braking action but impossible by the steering action. Thus, the operation flow goes through steps S4 and S6 to step S7. That is, in this case, the braking force control device 15 is actuated to generate a braking force "$F_L$".

Upon this, the braking force "$F_L$" thus generated is gradually increased from 0 (zero) with the certain gradient "α". In case wherein after judgment of impossibility of collision avoidance by the steering action, judgment is so made that the collision avoidance is also impossible even by the braking action, the time "T1" needed until starting of application of the braking force "$F_H$" is calculated by equation (8). Based on this needed time "T1" thus calculated, the gradient "α" of braking force "$F_L$" is derived by using the equation (9) and in accordance with the gradient "α", the braking force produced by braking force control device 15 is suitably controlled.

Accordingly, as is seen from FIG. 9, from a time "t1" when judgment is so made that the collision avoidance is impossible by the steering action, braking force control device 15 generates the braking force "$F_L$" that gradually increases from 0 (zero) with the certain gradient "α".

Within a time for which the collision avoidance is possible by the braking action but impossible by the steering action, the braking force "$F_L$" is kept generated and gradually increased.

When now, due to reduction of vehicle interval distance "d", the inequality (2) becomes unsatisfied and thus judgment is so made that the collision avoidance is impossible even by the braking action, that is, when judgment is so made that the collision avoidance is impossible by either of the braking and steering actions, the operation flow goes through step 54 to step S5. At this step, braking force control device 15 is commanded to generate the higher braking force "$F_H$".

Thus, as is seen from FIG. 9, at a time "t2", there is produced the braking force "$F_H$" that is higher than the braking force "$F_L$". That is, when it is judged that the collision avoidance is impossible by either of the braking and steering actions, that is, when it is judged that the possible collision can not be avoided by the braking and/or steering action by a driver, the higher braking force "$F_H$" is enforcedly generated by braking force control device 15. With this, the collision against the preceding vehicle can be actually avoided.

As is seen from FIG. 9, at the time "t2", the higher braking force "$F_H$" starts to be generated. However, at the time "t2", the smaller braking force "$F_L$" has already increased to a certain level, and thus, the gap appearing between the two braking forces "$F_H$" and "$F_L$" at the time "t2" does not give a driver an uncomfortable braking shock.

When, at the time "t1", it is judged that the collision avoidance is possible by the steering action but impossible by the braking action, the operation flow goes through steps S4 and S6 to step S7 to actuate braking force control device 15 to generate the braking force "$F_L$". Since, in this case, the collision avoidance by the steering action is judged possible, the time "T1" needed until starting of application of the braking force "$F_H$" is calculated by using equation (7). And, based on the needed time "T1" thus calculated, the gradient "α" of the braking force is calculated by using equation (9).

Thus, at time "t1", braking force control device 15 generates braking force "$F_L$" that increases with gradient "α", and at time "t2" when it is judged that collision avoidance is impossible by either of the braking and steering actions, braking force control device 15 generates higher braking force "$F_H$". However, for the reason as has been described hereinabove, the gap appearing between the two braking forces "$F_H$" and "$F_L$" at the time "t2" does not give a driver an uncomfortable braking shock.

Upon this, higher braking force "$F_H$" is applied to the road wheels of the own vehicle, and thereafter, the driver carries out a steering action or braking action, so that a safety distance "d" can be provided and kept between the preceding and own vehicles. When, at the time "t3" when the inequalities (2) and (6) are established, the operation flow of the flowchart goes through steps 54 and S6 to step S8. At this step, braking force "$F_H$" generated by braking force control device 15 is gradually reduced with a certain gradient "α'". The gradual reduction of the braking force "$F_H$" does not give the driver uncomfortable braking shock.

As is described hereinabove, in case of automatically producing a braking force by braking force control device 15, braking force "$F_L$" is gradually increased from 0 (zero) to a certain level and in case of stopping the braking force, the braking force "$F_H$" is gradually reduced to 0 (zero). Thus, application and removal of the braking force "$F_L$" or "$F_H$" to and from the own vehicle do not provide a driver with an uncomfortable shock.

In the present invention, the brake application timing made by braking force control device 15 is controlled by the steering characteristics of the own vehicle as well as vehicle interval distance "d" and relative vehicle speed "Vr". Accordingly, judgment as to whether a collision against the preceding vehicle by steering action is possible or not is precisely made. Furthermore, in the present invention, the time needed for avoiding the vehicle collision by the steering action is calculated with reference to the steering behavior characteristic of a driver who is in an emergency. Thus, much practical time needed for the collision avoidance by steering action is obtained.

When, under cruising of own vehicle with a preceding vehicle running ahead, it is judged that a collision against the preceding vehicle can not be avoided by the steering action or the braking action, a gradually increased smaller braking force "$F_L$" is produced by braking force control device 15. When thereafter it becomes judged that such vehicle collision can not be avoided by either of the steering and braking actions, the lower braking force "$F_L$" is instantly increased to a higher level "F$_H$". That is, upon requirement of higher braking force "F$_H$", the force "F$_H$" is instantly obtained, which brings about an assured avoidance of collision against the preceding vehicle.

The higher braking force "F$_H$" is produced only when it is judged that the collision avoidance is impossible by either of the steering and braking actions. Accordingly, when it is judged that the collision would be easily avoided by a driver's handling, that is, by turning the steering wheel or depressing the brake pedal, such higher braking force "F$_H$", which is not necessary in this case, is not produced.

For judging the possibility of collision against the preceding vehicle, the needed lateral moved distance "Y" is used. Thus, even if the own and preceding vehicles are running on respective traveling lanes that are offset from each other, the judgment as to possibility of collision is precisely carried out. For this judgment, various features of the own vehicle and the steering characteristic of a driver are used as factors in addition to the needed lateral moved distance "Y". Thus, precise judgment as to possibility of vehicle collision is carried out.

For obtaining the needed lateral moved distance "Y", smaller one of the two angles "θ1" and "θ2" of the right and left rear edges of the preceding vehicle is used. That is, based on the smaller one, judgment is carried out as to whether a collision against the preceding vehicle can be avoided or not if the steering wheel is turned in a direction corresponding to the smaller angle. This means that judgment for the possibility of avoiding the collision is applied to one of right and left turnings of the steering wheel, that has a higher possibility of avoiding the vehicle collision. If this judgment issues a high possibility of avoiding the vehicle collision, no braking force is produced by braking force control device 15.

The entire contents of Japanese Patent Application 2001-309247 filed Oct. 4, 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An automatic brake system of a motor vehicle which has a brake pedal and a steering wheel installed therein, the system comprising:
    a first section that detects a relative connection between the vehicle and a preceding object ahead of the vehicle;
    a second section that, when actuated, produces a braking force applied to the vehicle, the braking force produced by the second section being isolated from a braking force produced by the brake pedal;
    a third section that, based on the relative connection detected by the first section, carries out a judgment as to whether or not a possible collision of the vehicle with the preceding object is avoidable by operation of at least one of the brake pedal and the steering wheel; and
    a fourth section that actuates and controls the second section in accordance with the judgment made by the third section, thereby to control the braking force applied to the vehicle,
    wherein the fourth section is configured to carry out:
        causing the second section to produce a first grade braking force when the third section judges that the possible collision would be avoidable by operation of the brake pedal and unavoidable by operation of the steering wheel and also when the third section judges that the possible collision would be avoidable by operation of the steering wheel and unavoidable by operation of the brake pedal; and
        causing the second section to produce a second grade braking force when the third section judges that the possible collision would be unavoidable by operation of the brake pedal and also by operation of the steering wheel, the second grade braking force being greater than the first grade braking force.

2. An automatic brake system as claimed in claim 1, in which the third section comprises:
    a steering-based judge section that carries out a judgment as to whether or not the collision would be avoidable by operation of the steering wheel; and
    a braking-based judge section that carious out a judgment as to whether or not the collision would be avoidable by operation of the brake pedal.

3. An automatic brake system as claimed in claim 2, in which the steering-based judge section is configured to carry out:
    calculating, based on the relative connection detected by the first section, a lateral moved distance that is needed for avoiding the collision by operating the steering wheel;
    calculating, based on the calculated lateral moved distance, a first time needed by the vehicle for moving by the lateral moved distance;
    calculating a second time that passes until a time when the vehicle would collide against the preceding object; and
    judging that the collision is unavoidable when the first time is greater than the second time.

4. An automatic brake system as claimed in claim 3, in which the steering-based judge section is configured to derive the lateral moved distance based on a positional relationship between the vehicle and each of lateral rear edges of the preceding object.

5. An automatic brake system as claimed in claim 4, in which the steering-based judge section is configured to carry out determining, based on the positional relationship between the vehicle and each of lateral rear edges of the preceding object, a turning direction of the steering wheel that would induce a higher possibility of avoiding the collision.

6. An automatic brake system as claimed in claim 5, in which the steering-based judge section is configured to carry out:
    calculating a first lateral moved distance that is provided when the steering wheel would be turned in one direction for avoiding the collision;
    calculating a second lateral moved distance that is provided when the steering wheel would be turned in the other direction for avoiding the collision; and
    determining smaller one of the first and second lateral moved distances to the needed lateral moved distance.

7. An automatic brake system as claimed in claim 3, in which the second time is calculated based on dimensional and drivability features of the vehicle.

8. An automatic brake system as claimed in claim 3, in which the second time is calculated based on a steering behavior characteristic of a driver in an emergency.

9. An automatic brake system as claimed in claim 1, in which the first grade braking force produced by the second section is gradually increased with passage of time, and a gap appearing between the first grade braking force and the second grade braking force at the time when the braking force produced by the second section switches from the first grade braking force to the second grade braking force is smaller than a predetermined value.

10. An automatic brake system of a motor vehicle which has a brake pedal and a steering wheel installed therein, the system comprising:

first means that detects a relative connection between the vehicle and a preceding object ahead of the vehicle;

second means that, when actuated, produces a braking force applied to the vehicle, the braking force produced by the second means being isolated from a braking force produced by the brake pedal;

third means that, based on the relative connection detected by the first means, carries out a judgment as to whether or not a possible collision of the vehicle with the preceding object is avoidable by operation of at least one of the brake pedal and the steering wheel; and fourth means that actuates and controls the second means in accordance with the judgment made by the third means, thereby to control the braking force applied to the vehicle, wherein the fourth means is configured to carry out:

causing the second means to produce a first grade braking force when the third means judges that the possible collision would be avoidable by operation of the brake pedal and unavoidable by operation of the steering wheel and also when the third means judges that the possible collision would be avoidable by operation of the steering wheel and unavoidable by operation of the brake pedal; and causing the second means to produce a second grade braking force when the third means judges that the possible collision would be unavoidable by operation of the brake pedal and also by operation of the steering wheel, the second grade braking force being greater than the first grade braking force.

11. The automatic brake system as claimed in claim 1, wherein the fourth section is configured to cause the second section to refrain from producing a braking force when the third section judges that the possible collision can be avoided by operation of the brake pedal and can also be avoided by operation of the steering wheel.

12. The automatic brake system as claimed in claim 10, wherein the fourth means is configured to cause the second means to refrain from producing a braking force when the third means judges that the possible collision can be avoided by operation of the brake pedal and can also be avoided by operation of the steering wheel.

* * * * *